Sept. 1, 1959  K. E. HUMBERT, JR., ET AL  2,902,162
SCREW NECK TYPE FILTER CARTRIDGE
Filed March 29, 1955  2 Sheets-Sheet 1
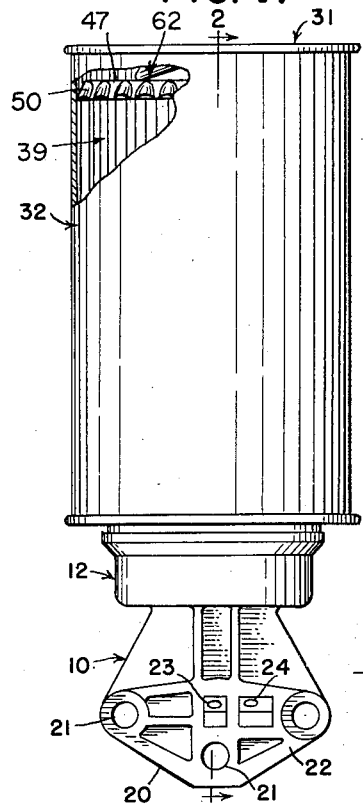
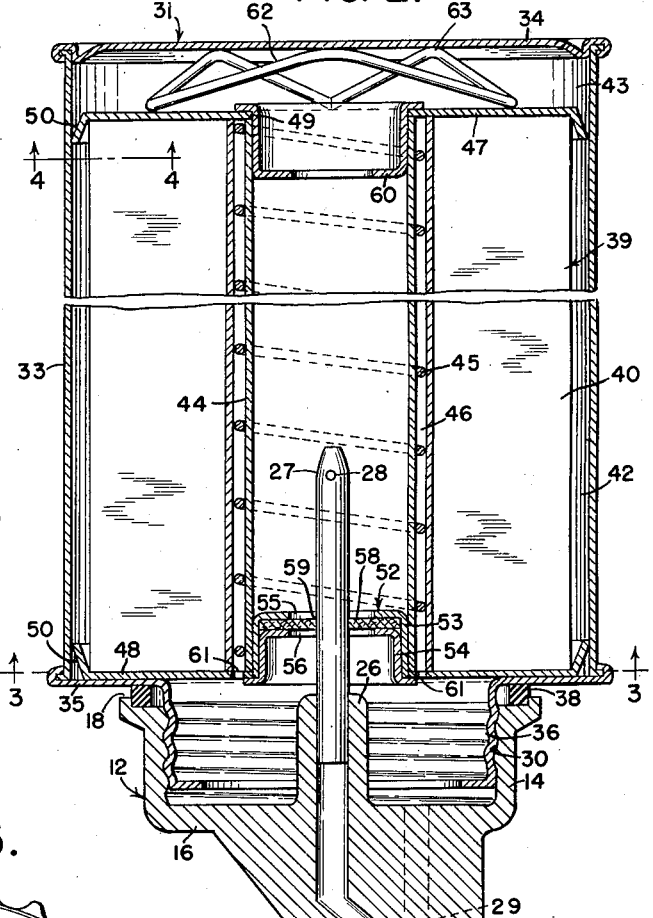
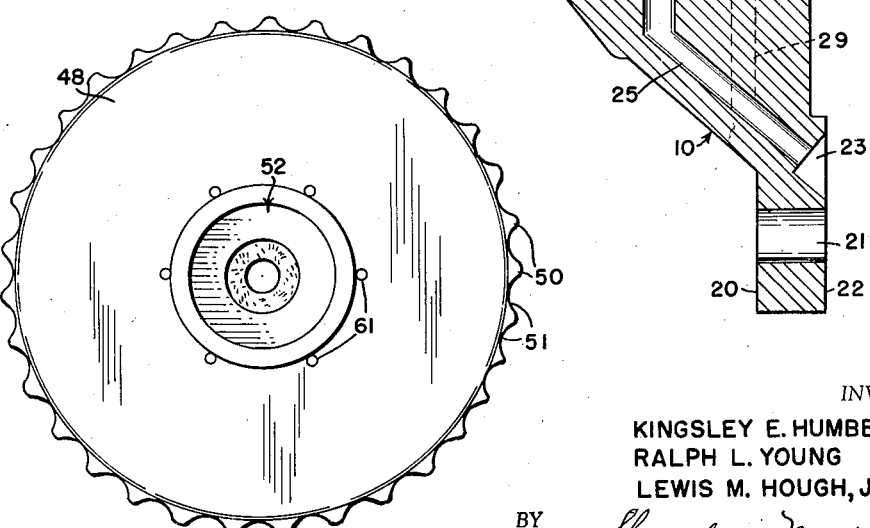
INVENTORS
KINGSLEY E. HUMBERT, JR.
RALPH L. YOUNG
LEWIS M. HOUGH, JR.
BY *Shoemaker & Mattare*
ATTORNEYS Sept. 1, 1959    K. E. HUMBERT, JR., ET AL    2,902,162
SCREW NECK TYPE FILTER CARTRIDGE
Filed March 29, 1955    2 Sheets-Sheet 2

INVENTORS
KINGSLEY E. HUMBERT, JR.
RALPH L. YOUNG
LEWIS M. HOUGH, JR.
BY *Shoemaker & Mattare*
ATTORNEYS

2,902,162

SCREW NECK TYPE FILTER CARTRIDGE

Kingsley E. Humbert, Jr., Ralph L. Young, and Lewis M. Hough, Jr., Gastonia, N.C., assignors to Wix Corporation, Gastonia, N.C., a corporation of North Carolina Application March 29, 1955, Serial No. 497,544

9 Claims. (Cl. 210—438)

This invention relates to improvements in filters and is directed particularly to filters designed primarily, though not necessarily, for use upon internal combustion engines.

Filters used upon internal combustion engines are mainly of two types. One of these types embodies a housing or shell wherein the filter element or body is intended to be removed from the shell when it becomes dirty or clogged so that it is no longer of use or functioning with the best efficiency is replaced by a new unit or element. In the other type the housing or shell and filter element comprise a unitary non-separable structure so that when the filter element has become dirty and clogged and is no longer of value, the entire unit must be disconnected from the engine oil lines and replaced by a new one.

The renewal of filters of the types referred to involves certain objectionable features such, for example, as the handling of an oily and dirty element which has to be removed from the shell or housing, as in the first type referred to or, with respect to the second type, the uncoupling and recoupling of oil line connections which may be troublesome.

The present invention, accordingly, has for one object to provide an improved unitary filter in which the housing is formed with the means for threadably coupling the same with a supporting base, with which base are connected outlet and inlet oil lines, and to thereby effect simply by the connection of the filter with the base, the coupling of the oil lines with parts of the filter element in the housing or shell through which dirty oil from one line will be passed to return in cleaned condition to the other line for reuse.

Another object of the invention is to provide, in a manner as hereinafter set forth, a replaceable filter of the above described character wherein there is provided an annular pleated paper filter element which is so constructed and arranged in the housing or shell that the inflowing dirty oil is caused to rise to and flow over the top end of the unit and radially toward the outer side thereof which it surrounds, and then flow radially back through the element to a collector passage for axial return flow and reuse.

Still another object of the invention is to provide in a filter of the type described, a filter unit of new and novel form, embodying an upright elongate pleated body designed to produce concentric inflow and outflow streams of oil with means at one end to restrict the outflow after passage of the oil through the filter material.

Still another object of the invention is to provide, in a manner as hereinafter set forth, a filter embodying a housing and an elongate annular pleated filter body therein, with novel means secured to the ends of such body for closing the flutes formed by the said pleats and designed to engage the wall of the housing and center the filter body therein while at the same time permitting free flow of liquid past the periphery thereof.

The foregoing objects are attained through the provision of a cylindrical shell housing or can having an axially extending threaded neck at one end defining an opening and designed to facilitate the threaded mounting of the filter in a supporting base which forms a permanent part of the internal combustion engine in association with which the filter is used. Such base is connected with oil lines of the engine, one of which brings out the dirty oil to the base and to the filter mounted thereon while the other one receives and returns the filtered and cleaned oil for reuse.

The shell or housing encases an elongate filter member which is in the form of an annular pleated paper body having an axial passage therethrough. Such axial passage is lined by an imperforate tube and circling the tube and spacing the same from the annular filter material is a helical wire or spring which provides a return flow passage for carrying cleaned oil to the lower end of the filter element after it has passed through such element from the outer side thereof. The imperforate tube lining the element has a gasket in the lower end through which extends a supply tube forming a part of the mounting base and the oil in such supply tube is caused to pass upwardly through the tube of the filter element to the top end thereof across which it flows radially outwardly into an annular space surrounding the filter element between the same and the wall of the housing or shell. After passage of the oil through the filter material it follows the helical pathway to the lower end of the central tube and returns to the base through restricted openings or passages which function to control the flow of the oil through the filter.

The invention will be best understood from a consideration of the following detailed description taken in connection with the accompanying drawings with the understanding that the invention is not confined to a strict conformity with the showing of the drawings but may be changed or modified within the scope of the appended claims.

In the drawings:

Fig. 1 is a view in elevation of a filter constructed in accordance with the present invention showing the same mounted on a supporting base, a portion of the filter shell being broken away.

Fig. 2 is a longitudinal section on an enlarged scale taken substantially on the line 2—2 of Fig. 1.

Fig. 5 is a bottom plane view of the filter unit.

Figure 3:
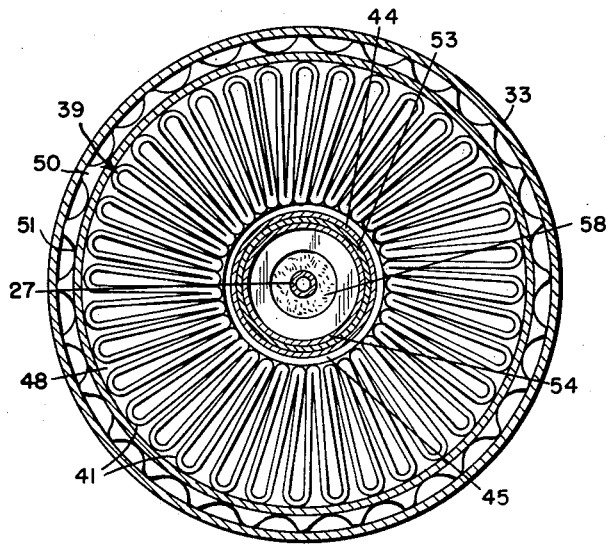
Fig. 3 is a horizontal section taken substantially on the line 3—3 of Fig. 2 looking in the direction of the arrow.
Figure 4:
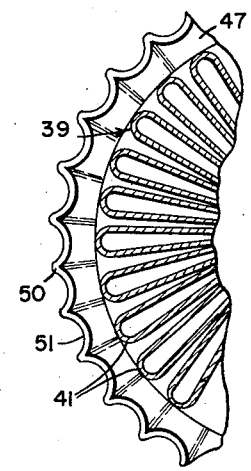
Fig. 4 is a fragmentary section taken substantially on the line 4—4 of Fig. 2.

Referring now more particularly to the drawings, reference will first be made to the first and preferred form or embodiment of the invention illustrated in Figs. 1 and 2.

In this first embodiment the numeral 10 generally designates a mounting base which is permanently secured to the engine structure and which is provided with oil passageways which are connected with the oil lines of the engine in the manner about to be set forth.

The mounting base 10 comprises a circular head 12 which is in the form of an upturned cup or cap consisting of the circular side wall 14 and the end or bottom wall 16. The circular side wall has a flat upwardly directed top or face 18.

Integral with the head is a mounting plate 20 which positions against a prepared surface of the internal combustion engine, not shown, to which it is secured by bolts or other securing elements, not shown, which pass through the openings 21 in the plate.

The mounting plate has opening through the engine wall engaging face 22 thereof an oil receiving port 23 and an oil discharge or return port 24 and the port 23 leads through the flow passage 25 upwardly through a nipple 26 which rises from the inner side or surface of the bottom wall 16 of the head. Fitted in this nipple 26 is an end of an upwardly directed oil tube 27 which has outlet apertures 28 in its upper end. The nipple and tube are disposed on the axial center of the head as illustrated.

The port 24 leads into the oil return tube 29 which passes upwardly through the bottom or end wall 16 of the head and opens through the inner surface thereof as shown.

The inner face of the circular side wall 14 is screw threaded as indicated at 30 for facilitating the mounting on the base of the filter unit about to be described.

The screw-on type replaceable or renewable filter is generally designated 31 and comprises a cylindrical shell or housing 32 which embodies the relatively long cylindrical wall 33 having a top end closed by a top wall or head 34 of solid or imperforate form and a bottom wall 35 which has a large central opening defined by the integral longitudinally extending threaded neck 36 which is adapted to engage in the head 12 in engagement with the screw threads 30 thereof. When thus secured in the manner shown, the interior of the shell is in communication with the oil tube 27 and the outlet passage 29, the tube 27 rising axially in the shell.

To assure a fluid tight connection between the filter structure and the head of the mounting base a suitable gasket 38 encircles the threaded neck 36 and is compressed between the wall 35 and the face 18 of the wall 14 of the base.

The housing or shell 32 encases a filter body which is generally designated 39. This filter body is of a length slightly less than the internal length of the shell and as shown rests upon the wall 35 when properly installed therein.

The filter body 39 comprises the long annular pleated filter paper 40, the pleats of which run lengthwise of the body and each of which pleats is designated 41, so that there is provided a multiplicity of longitudinal flutes. The overall diameter of the pleated body is less than the internal diameter of the shell so that when the body is set up in the shell and properly centered therein there will be provided an oil receiving space 42 around the filter and there is also provided an end space at the top end of the shell as indicated at 43 in which the oil is received in the manner hereinafter set forth.

Extending longitudinally through the center of the pleated filter material is an imperforate tube 44 and encircling this tube and spacing the same from the inner fold edges of the flutes of the filter material is a helical wire or spring 45. This spacer thus provides a helical or spiral flow passage 46 between the tube 44 and the filter material.

The two ends of the fluted material have secured thereto the top and bottom caps 47 and 48 respectively which are sealed at the end edges of the flutes by a suitable cement so that the oil cannot pass across the edges of the flutes. Each of these caps is in the form of a flat plate which is preferably of metal and has a central opening 49 which is concentric with the tube 44. The caps 47 and 48 are of larger diameter than the fluted filter body and, therefore, project beyond the sides of the same and have peripheral turned portions 50 which are scalloped as indicated at 51. The overall diameter of each of the caps approximates the internal diameter of the shell and the projecting or high points of the scallops contact the wall 33 of the shell when the filter body is placed in position therein and thus center the filter body in the shell and the scallops provide spaces through which the oil may flow.

With respect to the lower cap 48, this rests directly against the inner surface of the bottom wall 35 so that there is a fluid tight contact between this bottom cap and the bottom wall which prevents passage of oil from the space 42 directly into the neck 36.

The lower end of the tube 44 has fitted therein a thimble 52 which comprises an inner cup portion 53 and an outer cup portion 54 which have concentric central openings 55 and 56 respectively and between these cups there is secured a gasket 58 which has a central opening 59 of a diameter to snugly or tightly receive the oil tube 27. The upper end of the tube 44 has a single thickness thimble 60 which maintains the tube and fluted filter material in the proper relation to the upper end of the filter body.

As shown in Fig. 2 the bottom cap 48 which is secured to the lower end of the fluted filter material is provided with a series of small oil outlet apertures 61 which lie between the tube 44 and the inner fold edges of the filter material flutes thus aligning with the spiral flow passage 46 to transfer the oil therefrom into the head 12 of the mounting base.

As previously stated the overall length of the filter body is less than the interior length of the shell, thereby providing the space 43 at the top of the filter body and in order to firmly maintain the filter body in position upon the bottom wall 35 there is provided a resilient spacer frame generally designated 62 and here shown as made up of wire bent in substantially triangular form and having each of the sides of the triangle bent midway between its ends to form humps 63 which lie in a common plane spaced from the common plane in which the angles 64 lie. Thus, it will be seen that when the spacer is placed in the space 43 between the end wall 34 and the cap 47 in the manner illustrated the angles 64 will bear against the cap 47 and the humps 63 will be pressed against the head 34. Obviously, however, the spacer may be inverted so that opposite contacts will be had without changing the action desired.

In the construction thus far illustrated and described it will be seen that when the filter is threadably coupled with the base the oil pipe 27 will be extended through the gasket 58 so that the outlet aperture or apertures will be located within the tube 44. A tight connection will be formed between the tube and the edge of the opening 59 of the gasket. The inflowing dirty oil will fill the tube and overflow the top end of the filter body into the space 43 and then pass down into the space 42 around the filter. It will then flow or be forced through the material of the filter toward the center and will collect in cleaned condition in the spiral passage 44 between the inner edges of the filter material flutes and the tube and flow downwardly for discharge through the opening 61 into the head around the nipple 26. From this space or chamber which is formed by the plate 48, the threaded neck 36 and the bottom 16 of the head, the oil will return by way of the passage 39 and port 24 to the engine.

Figure 7:
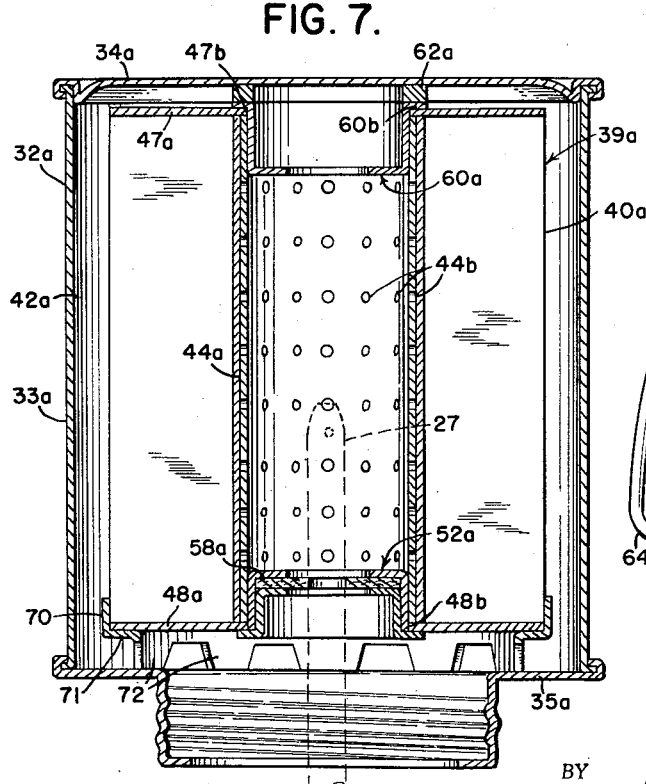
Fig. 7 is a central longitudinal section through a modified embodiment of the invention.
Figure 6:
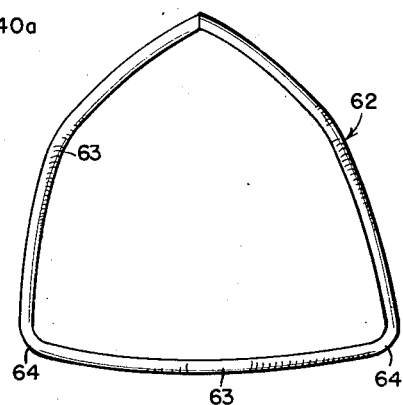
Fig. 6 is a plan view of the spacer interposed between the top of the shell and the filter unit.

In the structure just described, the oil flow is from the outside of the filter toward the center and in the modified embodiment illustrated in Fig. 7 the oil flow is in the reverse direction.

In this modified construction the shell or housing is formed in substantially the same manner as the shell 32 and is, accordingly, generally designated 32a. However, the filter body which is generally designated 39a is of somewhat different construction and is supported in a different manner. Since the shell or housing is of the same general design as the one previously described, the parts referred to will be identified by corresponding reference numerals bearing subscripts.

The unit 39a embodies the relatively long annular pleated paper filter 40a having the ends of the flutes closed by the top and bottom discs 47a and 48a respectively and which discs are apertured in the same manner as the discs previously referred to as indicated at 47b and 48b.

Extending longitudinally or axially through the filter body is the reinforcing tube 44a which is perforated as indicated at 44b. This tube is here shown as of solid form with apertures therein but it is to be understood that it may be of reticulate material or may be in the form merely of a spiral member similar to the wire spiral or frame 45.

The lower end of the filter, more particularly the apertured tube or sleeve 44a has fitted therein the thimble 52a similar to the one previously described and which has a centrally apertured gasket 58a to receive the oil tube 27 when the filter is mounted on the supporting base of the same form as the base 10 hereinbefore described.

The top end of the tubular member 44a has a thimble 60a therein which functions as does the thimble 60 to assist in maintaining the desired annular form of the filter body.

Interposed between the top disc 47a and the head 34a of the housing or shell is a washer or gasket 62a which is sealed to the disc 47a or to the outturned flange portion 60b of the thimble 60a and also to the underside of the head 34a so that, in this case, the oil is prevented by this gasket 62a from flowing across the top of the filter body into the space 42a between the filter body and the can wall 33a.

The lower end of the filter body has fitted thereto the collar 70 which carries the inturned flange 71 which bears against the underside of the bottom disc 48a and formed integral with this flange around the inner edge is the annular series of spacer fingers 72 which rest upon the wall 35a of the shell.

It will be seen from the foregoing that with this second embodiment of the invention, the oil entering the filter body 44a is forced to pass from the center radially outwardly through the filter material to collect in the surrounding chamber or recess 44a from where it passes downwardly between the spacer finger 72 and into the threaded neck 36a for return to the engine oil line.

From the foregoing it will be seen that there is provided by the present invention in the two embodiments illustrated and described replaceable filters which embody the use of filter paper material formed in a manner to give, by reason of the multiplicity of surfaces provided by the plates, a total filter area of large size and which functions more efficiently than filter material of the character composed of cotton waste or other bulky fibrous material.

It will also be seen that the present device can be easily and quickly removed from its connection with the oil lines of the engine and replaced and reconnected without having to handle any oily or dirty body and without having to disconnect and reconnect or re-establish oil line connections.

We claim:

1. A disposable filter unit for attachment to a mounting base having a fluid supply pipe, said unit comprising a can shell having a permanently attached imperforate endwall and an opposite permanently attached end wall provided with an opening, a threaded mounting neck carried by and projecting axially from the second mentioned wall and encircling the opening and adapted for hand attachment to and removal from the mounting base, an elongate annular pleated filter element in the casing having a length and diameter less than the length and diameter of the casing and an axial passage therethrough, end discs secured to and against the ends of the filter element, said element being spaced from the encircling can shell wall, means joining one end disc of the filter element with an end wall and spacing said disc from said end wall of the shell to permit fluid circulation flow radially across and between the said one end disc of the element and the adjacent end wall, the other end disc having a circular area of its surface around the axial passage of the filter element sealed to the adjacent end wall whereby passage of fluid radially between said other end disc and said adjacent end wall is prevented, a gasket secured in and across the end of said axial passage remote from said imperforate end wall of the shell adapted to establish a fluid-tight engagement about the fluid supply pipe introduced therethrough and into the passage upon attachment of the unit to the base to discharge fluid into the passage, and means whereby the fluid in the shell is caused to flow from said passage in a direction in part radially of and through the filter element and in part longitudinally thereof to and through said end wall opening and through said mounting neck.

2. A disposable filter unit for attachment to a mounting base of the type having a cup-like head forming a liquid sump provided with an outlet and a liquid inlet pipe rising from the bottom of the sump, said filter unit comprising a cylindrical shell having a permanently attached imperforate top wall closing one end and having a permanently attached bottom wall closing its other end and provided with an opening and adapted for hand attachment to and removal from the mounting base, means for coupling said bottom wall of the shell with said head of the mounting base for the discharge of liquid into the sump through said central opening, a filter unit in a fixed position in the shell and embodying an elongate annular pleated filtering element having an axial passage therethrough, top and bottom end discs secured to and against the ends of said element, a gasket secured within and across the end of the passage adjacent to said bottom wall, said gasket being of a size to receive and tightly encircle said pipe and said pipe being of a length to terminate within the passage when the shell is operatively coupled with the head for discharge into the passage, said filter element being of an overall diameter and length less than the interior diameter and length of the shell, means centering the said element in the shell, a spacing member between one end disc and the adjacent end of the shell maintaining said end disc and said adjacent end of the shell spaced apart, the spacing member being formed to permit liquid circulation across said one end disc, said spacing member further being of a form to encircle the adjacent end of the axial passage and bear against both the said one end disc and the said adjacent end of the shell, and means whereby the fluid in the shell is caused to flow from said passage in a direction in part radially of and through the filter element and in part longitudinally thereof toward and through said central opening of the shell.

3. The invention according to claim 2, wherein said spacer member comprises a resilient element compressed between the top end wall and the adjacent top disc and maintaining the bottom disc in fluid tight engagement with the casing bottom wall.

4. The invention according to claim 2, wherein said last means includes an imperforate tube having ends terminating at and attached to said top and bottom end discs, and a spiral element encircling said tube and maintaining the same and the filter element in spaced relation.

5. The invention according to claim 4, with means for discharging filtered liquid from the space between the tube and the filter element to and through the central opening of the bottom wall into the sump comprising a plurality of apertures in the bottom disc around the center opening thereof and outside of said tube.

6. A filter unit comprising an elongate casing having a side wall, a closed imperforate top end wall and a bottom end wall having an opening centrally therethrough, a mounting fluid-outlet neck extending from the bottom end wall around the opening thereof, an elongate longitudinally pleated annular filter element forming a permanent part of and sealed in the casing, said element having an axial passage therethrough and having an outside diameter and an overall length less than the inside diameter and length of the casing, end discs secured to and closing the ends of the flutes formed by the element pleats, means forming an annular sealing connection between the surface of one end disc of the filter element and the adjacent end wall of the casing, said sealing connection encircling the adjacent end of the axial passage, spacing means encircling the axial passage and positioned between the other end wall of the casing and the adjacent disc and formed to permit free radial flow of liquid across the said adjacent disc, a gasket disposed in the bottom end of said axial passage of the filter element adapted to receive an end portion of and have sealing engagement about a liquid supply pipe for the discharge of liquid to be filtered into the axial passage, and means controlling the flow of liquid from said passage in part radially of and through the filter element and in part longitudinally thereof toward and through said bottom end wall opening.

7. A filter element comprising an elongate casing, having a side wall, a closed top end wall and a bottom end wall having an opening therethrough, a mounting neck on the bottom end wall around the opening thereof, an elongate longitudinally pleated annular filter element in the casing having an axial passage therethrough and having an outside diameter and an overall length less than the inside diameter and length of the casing, top and bottom cap discs secured to the ends of the filter element and closing the ends of the flutes formed by the filter element pleats, said bottom disc resting upon and being in sealing contact with said bottom end wall and having a central opening coaxial with the filter element passage, said top disc having spaced-apart outwardly projecting peripheral portions engaging the casing side wall and centering the filter element in the casing and having a central opening coaxial with the filter element passage, spacer means between and separating the top disc and the top end wall, a gasket secured in and coaxial with the bottom end of said axial passage and designed to receive an end portion of and have sealing engagement about a liquid supply pipe projecting into the passage for discharge therein, an imperforate tube in the axial passage of the filter element for conducting liquid to and through the opening of the top disc for radial flow to the outside of the filter element through said spacer means, said tube being spaced from axial passage of the filter element, and means for discharging filtered liquid from the space between the tube and the filter element through said bottom wall opening.

8. The invention according to claim 7, wherein the said spacer means is in the form of a resilient open frame having alternately upwardly and downwardly extending portions pressing respectively against the top end wall and the top disc and imposing downward thrust against the filter element to maintain the said sealing contact of the bottom disc with the said bottom end wall.

9. The invention according to claim 7, wherein said top disc has a downturned encircling flange interposed between the filter element and the casing side wall and said flange being deformed to provide the said peripheral portions between which the liquid flows.

References Cited in the file of this patent

UNITED STATES PATENTS

| 1,676,268 | Lipscomb | July 10, 1928 |
| 1,872,430 | Ericson | Aug. 16, 1932 |
| 2,249,681 | Briggs et al. | July 15, 1941 |
| 2,418,777 | Le Clair | Apr. 8, 1947 |
| 2,562,361 | Kasten | July 31, 1951 |
| 2,600,480 | Cloedy et al. | June 17, 1952 |
| 2,680,521 | Kamrath | June 8, 1954 |
| 2,749,265 | Fricke | June 5, 1956 |